W. GLIDDEN.
TIRE ARMOR.
APPLICATION FILED AUG. 8, 1917.
1,247,393.
Patented Nov. 20, 1917.
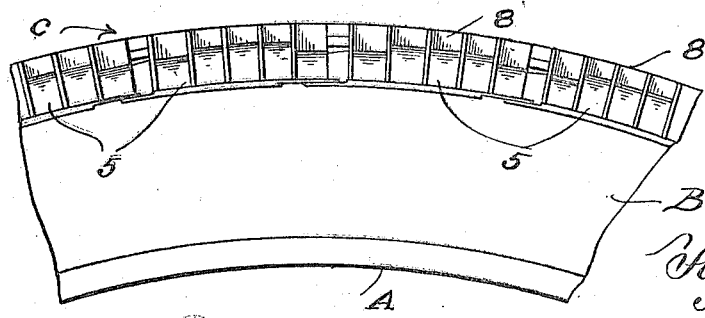
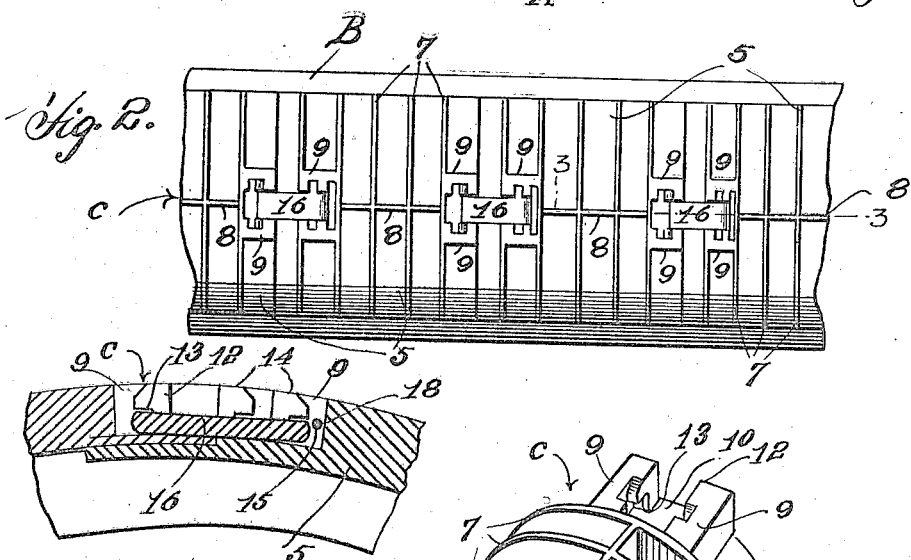
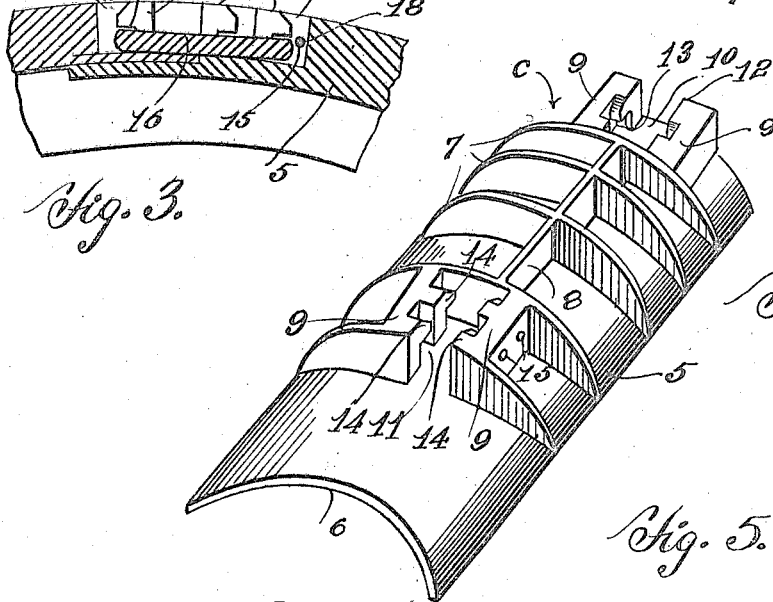
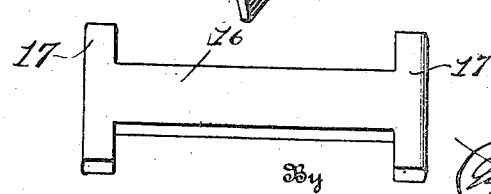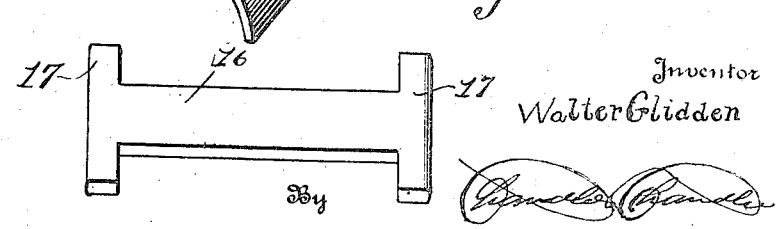
Witness
O. H. Cook
Inventor
Walter Glidden
By
Attorney

UNITED STATES PATENT OFFICE.

WALTER GLIDDEN, OF WATERFORD, OHIO, ASSIGNOR OF ONE-HALF TO AMOS E. ROBERTS, OF WATERFORD, OHIO.

TIRE-ARMOR.

1,247,393.     Specification of Letters Patent.     Patented Nov. 20, 1917.

Application filed August 8, 1917. Serial No. 185,143.

*To all whom it may concern:*

Be it known that I, WALTER GLIDDEN, a citizen of the United States, residing at Waterford, in the county of Washington, State of Ohio, have invented certain new and useful Improvements in Tire-Armors; and I do hereby declare the following to be a full, clear, and exact description of the invention, such as will enable others skilled in the art to which it appertains to make and use the same.

This invention relates to tire armors and is directed more particularly to a protective non-skid device for pneumatic tires.

An object of the present invention resides in the provision of an appliance of the above characters which may be quickly and conveniently attached to and detached from a tire and which furthermore embodies means of novel construction and arrangement through the medium of which it may be adjusted to accommodate it to tires of various dimensions.

With the above and other objects of similar nature in view, the invention consists in the construction, combination and arrangement of parts, set forth in and falling within the scope of the appended claim.

In the drawing:—

Figure 1 is a side elevation of a portion of a vehicle wheel and pneumatic tire showing the invention applied, Fig. 2 is a plan view thereof, Fig. 3 is a longitudinal section taken on the line 3—3 of Fig. 2, and Fig. 4 is a detached perspective view of one of the tread sections.

Fig. 5 is a perspective view of the keeper.

Referring now more particularly to the accompanying drawing, there is illustrated a portion of a vehicle wheel A equipped with the usual pneumatic tire B, the invention being shown generally at C in operative position upon the latter.

Generally speaking the appliance consists of a plurality of tread units or shoes 5 which are constructed of suitable light and durable metal and are transversely concaved throughout their length as indicated at 6 so as to receive and snugly conform to the curvature of the periphery of the tire B. The shoes 5 are each further formed with a plurality of transversely arranged ribs 7 which project above the faces of the shoe and afford a secure grip when passing through mud, sand or other loose and slippery substances. To prevent sidewise skid of the shoes, the latter are provided with a central longitudinal rib 8.

When applied to the tire B, the several units or shoes 5 are arranged in end to end alinement and extend completely around the periphery of the tire as is clearly illustrated, an end of each shoe overlapping the adjacent end of the next shoe so that no space is left through which a nail or other article might pass and puncture or otherwise mutilate the tire B. In order to secure the several units or shoes 5 upon the tire, said shoes are provided on their upper faces adjacent each end with a pair of spaced parallel ribs 9 which extend longitudinally of and form in conjunction with the related shoe channels 10 and 11 opening through the ends of said shoe as is evident from the drawing.

The side walls of the channel 10 of each of the shoes 5 are provided with integral projections 12 that extend into the channel and have their inner side edges cut away or recessed as indicated at 13 for a purpose to presently appear. The side walls of the channels 11 are provided each with a pair of projections 14 constructed, arranged and recessed similarly to the projections 12, while said side walls are additionally provided with pairs of transversely alined apertures 15. When assembled, the shoes 5 are disposed with their channels 10 registering with the channels 11 of the next adjacent shoe, while engaged in said registering channel is a keeper 16 consisting of a metal plate that is provided at is ends with lateral extensions or lugs 17, those at one end of the plate entering the recesses 13 in the projections 12 of the channel 10 while those of the other end are interchangeably engaged in alined recesses in the projections 14 of the channel 11 and are held against displacement by means of a pin 18 passed through alined apertures 15 in the walls of the channel 11. To increase or decrease the circumference of the protector as the case may be, it is evident that the pins 18 may be withdrawn and the projections 17 of the keepers engaged in other of the recesses in the projection 14 after which the pins 18 are replaced.

Furthermore by this arrangement the several units or shoes 5 are freely movable with respect to each other so as to effect in no wise the resiliency of the tire B, the keepers 17 and their connections with the units serving in the nature of hinges as will be understood without further explanation.

What I claim is:—

A protective device for tires consisting of a plurality of tread units adapted to extend in end to end alinement about the periphery of a tire, each of said units being provided with a channel opening outwardly of each of its ends, and registering with a channel in the next adjacent shoe, the side walls of said registering channels having therein transversely alined recesses opening inwardly of the channel, a keeper engaged removably in each pair of registering channels provided with lateral extensions at its ends seated hingedly in related recesses in the walls, and means to prevent displacement of said keepers from the channels.

In testimony whereof, I affix my signature in the presence of two witnesses.

WALTER GLIDDEN.

Witnesses:
HOMER MYERS,
G. O. VAUGHN.

Copies of this patent may be obtained for five cents each, by addressing the "Commissioner of Patents, Washington, D. C."